United States Patent [19]

Masuzaki et al.

[11] Patent Number: 5,179,649
[45] Date of Patent: Jan. 12, 1993

[54] METHOD FOR GENERATING TITLE INFORMATION ENTRY FORMAT AND METHOD FOR FILING IMAGES IN IMAGE FILING DEVICE

[75] Inventors: Hidefumi Masuzaki, Hadano; Satoshi Ito, Odawara; Toshihiro Hananoi, Kanagawa, all of Japan

[73] Assignee: Hitachi, Ltd., Tokyo, Japan

[21] Appl. No.: 356,277

[22] Filed: May 24, 1989

[30] Foreign Application Priority Data

May 26, 1988 [JP] Japan .................. 63-127188

[51] Int. Cl.$^5$ .................................. G06F 15/20
[52] U.S. Cl. ................................. 395/148; 395/117
[58] Field of Search .................. 364/518, 521, 523; 382/56, 61; 395/144–149

[56] References Cited

U.S. PATENT DOCUMENTS

| | | | |
|---|---|---|---|
| 4,408,181 | 10/1983 | Nakayama | 364/900 X |
| 4,516,265 | 5/1985 | Kizu et al. | 382/48 |
| 4,566,127 | 1/1986 | Sekiya et al. | 382/61 X |
| 4,574,395 | 3/1986 | Kato | 364/518 X |
| 4,760,606 | 7/1988 | Lesnick et al. | 382/61 X |
| 4,907,283 | 3/1990 | Tanaka et al. | 382/56 X |

FOREIGN PATENT DOCUMENTS 55-135967 10/1980 Japan .
62-260475 11/1987 Japan .

Primary Examiner—Heather R. Herndon
Attorney, Agent, or Firm—Fay, Sharpe, Beall, Fagan, Minnich & McKee

[57] ABSTRACT

When image information of documents is stored in the image storage of an image filing device, the title information is entered for each document for easy retrieval of the image information after filing. For entry of the title information for each document into the image filing device, it is necessary to fill in title information in the title entry format, supply the title information entry format through the image input unit of the image filing device and to recognize the characters of the title information. This title information entry format is automatically designed and entered into the image storage by the operator who supplies the title information and file name by operating the keyboard of the image filing device. When the operator designates one of the plural title information entry formats entered for each file, the title information entry format thus designated is printed out by the image output unit of the image filing device. The printed title information entry format is filled-in with the title information and set in the image input unit of the image filing device along with a document to be filed. With the above operations, the image filing device recognizes the title information and files it along with the document into the image storage.

30 Claims, 9 Drawing Sheets

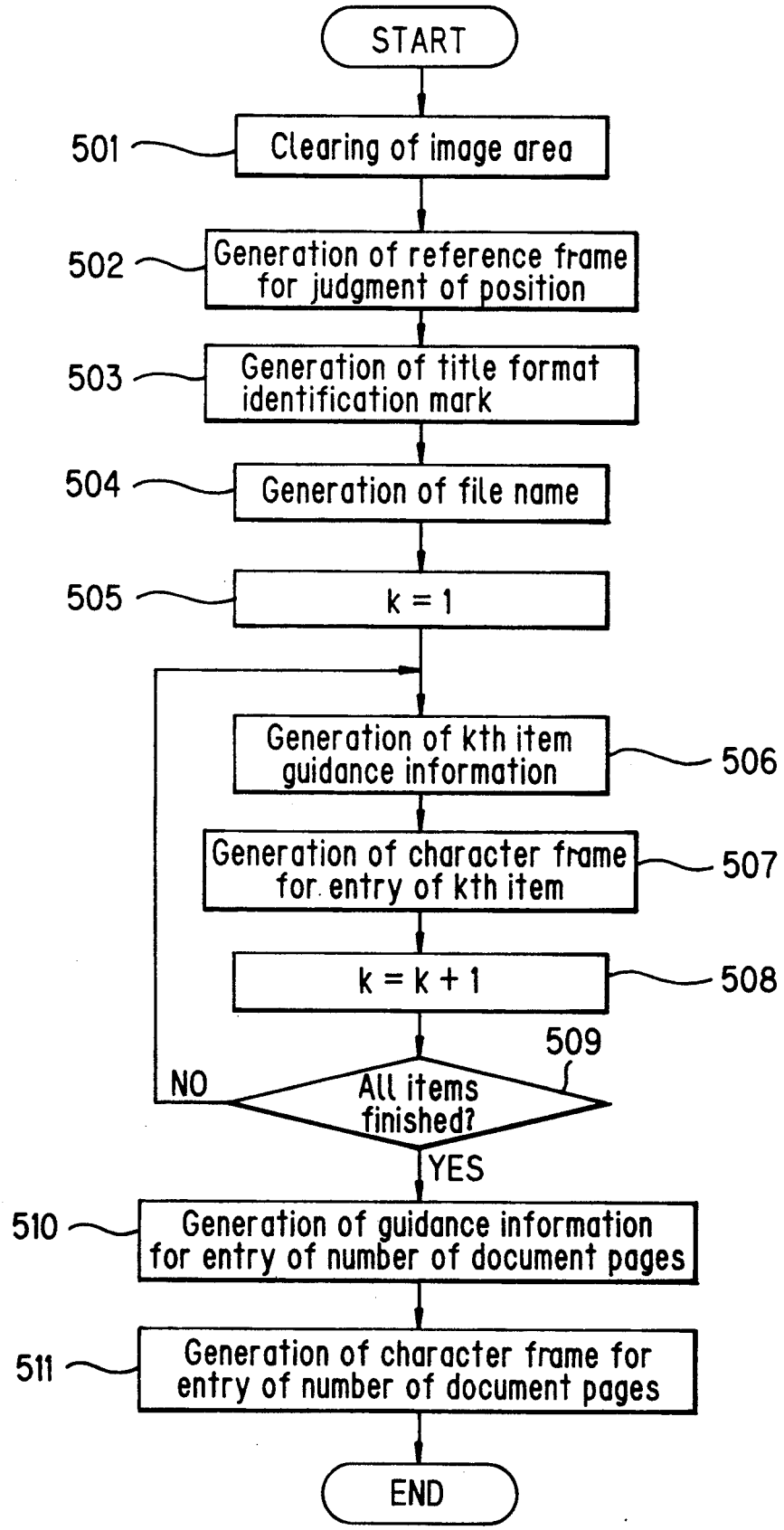

METHOD FOR GENERATING TITLE INFORMATION ENTRY FORMAT AND METHOD FOR FILING IMAGES IN IMAGE FILING DEVICE

BACKGROUND OF THE INVENTION a) Field of the Invention

The present invention relates to a method for automatic generation of a title entry format used in the retrieval of image information in an image filing device which files a mass of image information and retrieves intended image information from among the entered image information, and a method for filing images using the title entry format.

b) Description of the Related Art

In an image filing device in which a mass of documentary information is stored as image data in a large capacity memory medium such as an optical disk or the like, it is necessary to enter retrieval title information as attached to a document which is to be filed. Such retrieval title information comprises the name of a document to be filed, date of filing, keyword indicative of the contents of the document, etc. and is used as a retrieval index for calling out a necessary document from among many filed documents. Namely, if there is no retrieval title information, it is impossible to select a certain document from a mass of documentary information. Hence, it is an indispensable job in the image filing device to assign retrieval title information to the documentary information when entering the documentary information.

At present, when a document is filed in the image filing device developed for practical use, retrieval title information is entered by the operator using the keyboard. So, in case it is intended to file many documents, it is necessary to enter title information for each of the documents through key-operation and the operator must operate the keyboard for a long time. Even if the filing speed of the image filing device itself is improved, the filing of the documents cannot be done in a shorter time than the time required for the operator to complete the key-operation for filing the documents. A user who introduces an image filing device will first encounter a problem of initial input, that is, what he should do for effective storage of a mass of documentary information into the filing device. The improvement in document filing speed and in operability for entry of the documents are the most important factors for the image filing device. So, the system in which the operator operates the keyboard for input of title information will greatly limit the improvement in performance of the image filing device.

To solve the above-mentioned problems, the Japanese Unexamined Patent Publication Nos. Sho 55-135967 and Sho 62-260475 disclose the following inventions. According to these inventions, title information to be attached to each of the documents to be filed is entered into a title entry format separate from a document to be filed, the title information entered in the title entry format is recognized by utilizing a technique of character recognition and it is entered into the image filing device. These methods obviate the key-input operations by the operator for input of any title information, whereby the filing performance of the image filing device can be greatly improved.

With the above-mentioned techniques, the information entered in the title entry format is read by a character recognition technique adopted in the OCR (optical character reader) in practice, and the title information thus read is entered and automatically attached to the document to be filed. The OCR reads characters entered in a format of a fixed form such as various kinds of slips, work schedules, arrangement charts, etc. The format of a fixed form used with the OCR has printed thereon a plurality of character entry frames for specifying the positions where characters are to be written. The information on the position of each character entry frame printed on the format is previously entered in the OCR and the positional information is used for extracting one after another character images to be recognized from the entered image information.

In use of the above-mentioned format reading method the OCR is applied for input of title information in an image filing device, and it becomes necessary to design and print a title entry format of a fixed form. The contents of documents to be filed into the image filing device vary from one to another user, and also plural kinds of documents are filed by each user. Further, the contents and form of the title information to be used in retrieval of a document vary depending upon the contents of the document.

The filing of newspaper clippings will be explained as an example. For this purpose, the following form of title information is conveniently usable:

(item 1) Paper name with a maximum of 10 characters (item 2) Date of issue with a maximum of 10 characters (item 3) Keyword indicative of the article contents with a maximum of 20 characters Note that the numbers of characters specified here are given by way of example. In the above example, an area of 40 characters is taken for title information, and divided into three items. A paper name is entered into the first item area of 10 characters, a date of issue into the second item area of 10 characters, and a keyword for the contents of the article into the third item area of 20 characters.

Also, for filing of patent information, for example, the following form of title information can be conveniently used:

(item 1) Title of invention with a maximum of 20 characters (item 2) Publication No. with a maximum of 10 characters (item 3) Date of filing with a maximum of 10 characters (item 4) Keyword for the contents of the invention with a maximum of 20 characters In this case, an area of 60 characters is taken for title information, and divided into four items. For generating a title entry format, it is necessary to print character frames for entry of a title information for each of the items, and also it is necessary, with a consideration given to the ease of use of the format, to print, by the side of the character frames for each item, guidance information (such as paper name, date of issue, etc. in case of the above-mentioned filing of newspaper clippings) indicating the contents of the title information to be filled in the character frames. Therefore, different title entry formats are to be generated separately depending upon the contents and forms of various title information. For printing of formats, initial costs such as costs for the block copy, etc. are necessary, and so the printing of title entry formats is a big burden to each user. Also, once a title entry format is created and printed massively, it will be difficult to change the contents and form of the title entry form thereafter, causing the image filing device to be reduced in flexibility.

As described in the above, it is essential, for automatic assignment of title information by an automatic recognition technique of a document to be filed, to simply generate a title entry format, but in the conventional techniques, no consideration is given to this generation of title entry information.

SUMMARY OF THE INVENTION

The present invention has an object to provide a method for generating a title information entry format in an image filing device and a method for image filing, in which the title entry format form can be simply generated and it is unnecessary to enter into the image filing device beforehand any positional information of each character entry frame in the title entry frame.

A method for generating a title information entry format according to the present invention is to be adapted for use in an image filing device which is supplied with an image information and title information, imparts the title information to the supplied image information and stores them, selects based on an attached title information an intended image information from among the stored image information, displays and prints out the selected image information, and it is characterized in that a title information entry format image is generated by calculating, based on the form of a title information entered by the operator of the image filing device, the positions of character frames formed in the title information entry format and the title information entry format image thus generated and displayed is printed out to produce a title information entry format.

Another method for generating a title information entry format according to the present invention is to be adapted for use in an image filing device which is supplied with an image information and title information, imparts the title information to the supplied image information and stores them, selects based on an attached title information an intended image information from among the stored image information, displays and prints out the selected image information, and it is characterized in that a title information entry format image is generated by calculating, based on the form of a title information entered by the operator of the image filing device, the positions of character frames formed in the title information entry format, the title information entry format image thus generated is stored, one of plural title information entry format images stored is designated and printed out for producing a title information entry format.

A further method for generating a title information entry format according to the present invention is to be adapted for use in an image filing device which is supplied with an image information and title information, imparts the title information to the supplied image information and stores them, selects based on an attached title information an intended image information from among the stored image information, displays and prints out the selected image information, and it is characterized in that a title information entry format image is generated by calculating, based on the form of a title information entered by the operator of the image filing device, the positions of character frames formed in the title information entry format, the title information entry format image and the calculated positions of the character frames are stored, one of plural title information entry format images thus generated is selected and printed out for producing a title information entry format, and in case a title information is entered in the title information entry format thus produced and the title information entry format is entered along with a document image, the positions of the character frames corresponding to the title information entry format are read, the entered title information is read through character recognition with reference to the read positions of the character frames and stored along with the image information.

Generally, the documents to be filed in an image filing device vary in contents thereof from one to another and so the title information attached to such documents differs in form thereof from one to another depending upon the contents of the documents. In case documents of different kinds are to be stored in a memory medium such as an optical disk, the memory medium is divided into plural files and documents of the same kind are entered into a selected file. For example, the information from newspaper clippings are entered into a file A while the patent information are entered into a file B. Therefore, the forms of the title information attached to the documents in each file are all the same. According to the methods for generating title information entry format and methods for filing images according to the present invention, a form of title information is set in order to generate each file. This form setting is done by the operator using the keyboard and what are to be set are as follows for example:

(1) Number of items included in title information
(2) Number of characters in each item
(3) Guidance name indicative of the contents of title information to be entered for each other ("paper name", "date of issue", etc. in the aforementioned example)

According to the present invention, when the title portion of the title information is set, an image data of title information entry format is generated inside the device and displayed, and stored in the device as necessary. Also, the information on the positions of character frames in the title information entry format are stored along with the image data in the image filing device.

For filing of a document, the operator first lets the image filing device print out a necessary number of sheets of title information entry format corresponding to a file into which he intends to file the document. Next, referring to the contents of a document to be filed, he enters the printed title information entry format with a title information to be attached to the document. When entering the title information, the operator can leave the filing device and may have any other operator use the filing device. After filling the title information entry format with the title, the operator designates in the image filing device a file into which the document is to be entered. The file designated here should correspond to the above-mentioned title information entry format. The operator attaches the title information entry format to the top of the document to be filed and loads them in an automatic document feeder of the image input scanner. Next, he starts the image filing device. The device will read the title information entry format as an image data, and extract and recognize the character images with reference to the entry character frame positional information stored in the device. The title information read here is temporarily stored in the device, and then written along with the document image information supplied from the scanner into the image information storage medium such as optical disk or the like.

According to the present invention, it is unnecessary when filing a document in an image filing device to enter any title information by operating the keyboard, and thus it is possible to greatly improve the document filing speed. Also, since the title entry format is printed out by the image filing device itself, it is not necessary to design and print out any title entry format at the user's side and to measure, and supply to the image filing device, the positions of entry character frames in the title entry format.

These and other objects and advantages of the present invention will be better understood from the ensuing description made, by way of example, of the preferred embodiments with reference to the drawings.

BRIEF DESCRIPTION OF THE DRAWINGS

FIG. 5 is a flow chart showing an example procedure for generating a title information entry format image;

DETAILED DESCRIPTION OF THE PREFERRED EMBODIMENTS

Figure 1:
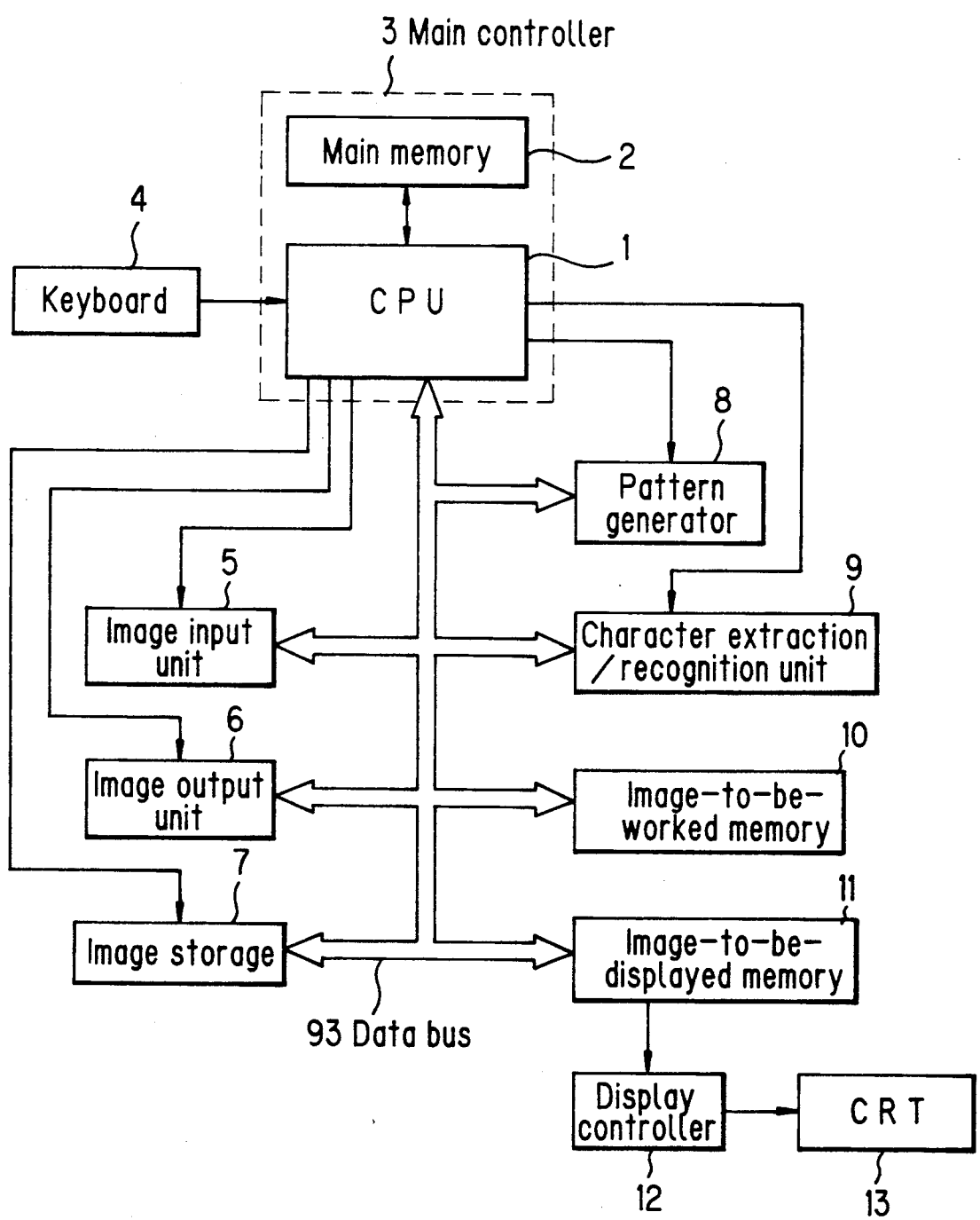
FIG. 1 is a block diagram showing one embodiment of the present invention.

FIG. 1 is a block diagram of an image filing device with a character recognition function, showing one embodiment of the present invention. In FIG. 1, the reference numeral 1 indicates a CPU (central processing unit), 2 a main memory, 3 a main controller and 4 a keyboard. The main controller 3 controls the entire image filing device, and the operator operates the image filing device by operating the keyboard 4. The main controller 3 is composed of the CPU 1 which controls the various components of the image filing device and the main memory 2. The control program which runs the CPU 1 is stored in the main memory 2 which is also used as a work memory area for the operation of the CPU 1. The reference numeral 5 indicates an image input unit which supplies image information to a data bus 93. This image input unit 5 is composed of a well-known apparatus such as an image scanner or the like which scans two-dimensionally an inserted document, photo-electrically converts the scanned image and outputs two-dimensional image information. The image input unit 5 is provided with an automatic document feeder which automatically feeds plural sheets one by one beginning with the top one, thereby entering images sequentially. This automatic document feeder is a well-known one used in practice with ordinary image scanners. The reference numeral 6 indicates an image output unit which provides a hard copy of image information supplied through the data bus 93. This image output unit 6 comprises a well-known image printer like an LBP (laser beam printer). An image storage 7 is also provided to store image information supplied through the data bus 93, and it is a well-known large capacity storage device such as an optical disk, magnetic disk or the like. The image storage 7 stores the image information as well as the coded information such as retrieval title information, etc. attached to each image information. There are provided a work image memory 10 and display image memory 11 which temporarily store image information supplied through the data bus 93. An image information stored in the memory 11 is read from a display controller 12 and displayed on a CRT 13. In this embodiment, the CRT 13 is used as means for displaying image information, but it may be any other display means such as an LC (liquid crystal) display or the like. Also, a pattern generator 8 is provided to receive an instruction from the main controller and generate image and graphic patterns such as characters symbols, lines etc. The image and graphic patterns thus generated are written into the work image memory 10 and display image memory 11. The pattern generator 8 is used to generate an image which is to be displayed on the CRT 13 and an image of title information entry format. There is further provided a character extraction/recognition unit 9 to extract each character image from the image information in the work image memory 10, recognize the character and report the recognition result to the main controller 3. The image data of title information entry format supplied from the image input unit 5 is stored into the work image memory 10, and the character extraction/recognition unit 9 extracts the title information from the image data and recognizes the extracted title information.

In case a document image is entered into the image filing device shown in FIG. 1, the operator has to first select one file into which the document image is to be entered from the plural files stored in the memory medium in the image storage 7. If an intended file exists, he assigns retrieval title information to the document image and additionally writes the document image into the above-mentioned selected file. If the intended file is not found, the operator has to generate a file.

Next, the procedure for generating a file in the image filing device will be explained. A file is generated for each kind of the contents of a document to be filed. Namely, the information of newspaper clippings is entered in a file "0001", for example, and patent information is entered in a file "0002", for example. The form of the retrieval title information attached to each document image differs from one file to another. In case of the file "0001" in which the above-mentioned newspaper clipping information is entered, the form of the title information is set as follows, for example:

(item 1) Paper name with 10 characters
(item 2) Date of issue with 10 characters
(item 3) Contents of article with 20 characters In the above example, the length of the title is 40 characters, and the contents of the title are divided into three items of 10, 10 and 20 characters, respectively, which are assigned: "paper name", "date of issue" and "contents of article", respectively. For generating the above-mentioned file, the operator operates the keyboard to initialize the image filing device for file generation and supplies the name of a file to be newly generated and the form of the title information. In this embodiment, four characters are used for the file name. In the above example,, the operator supplies the image filing device with "0001" as the file name. Also, it is necessary to supply a total number of characters of the title information (title length), a number of items indicating the subdivided title contents, a number of characters of each item and an item name indicating the contents of each item. In the above example, the total number of characters of the title information is 40, the number of items is 3, the number of characters and name of the first item are 10 and "paper name", respectively, the number of characters and name of the second item are 10 and "date of issue", respectively, and the number of characters and name of the third item are 20 and "contents of article", respectively. When input of the above file name and form of the title information is completed, the image filing device generates the image data of title information entry format in itself.

Figure 2:
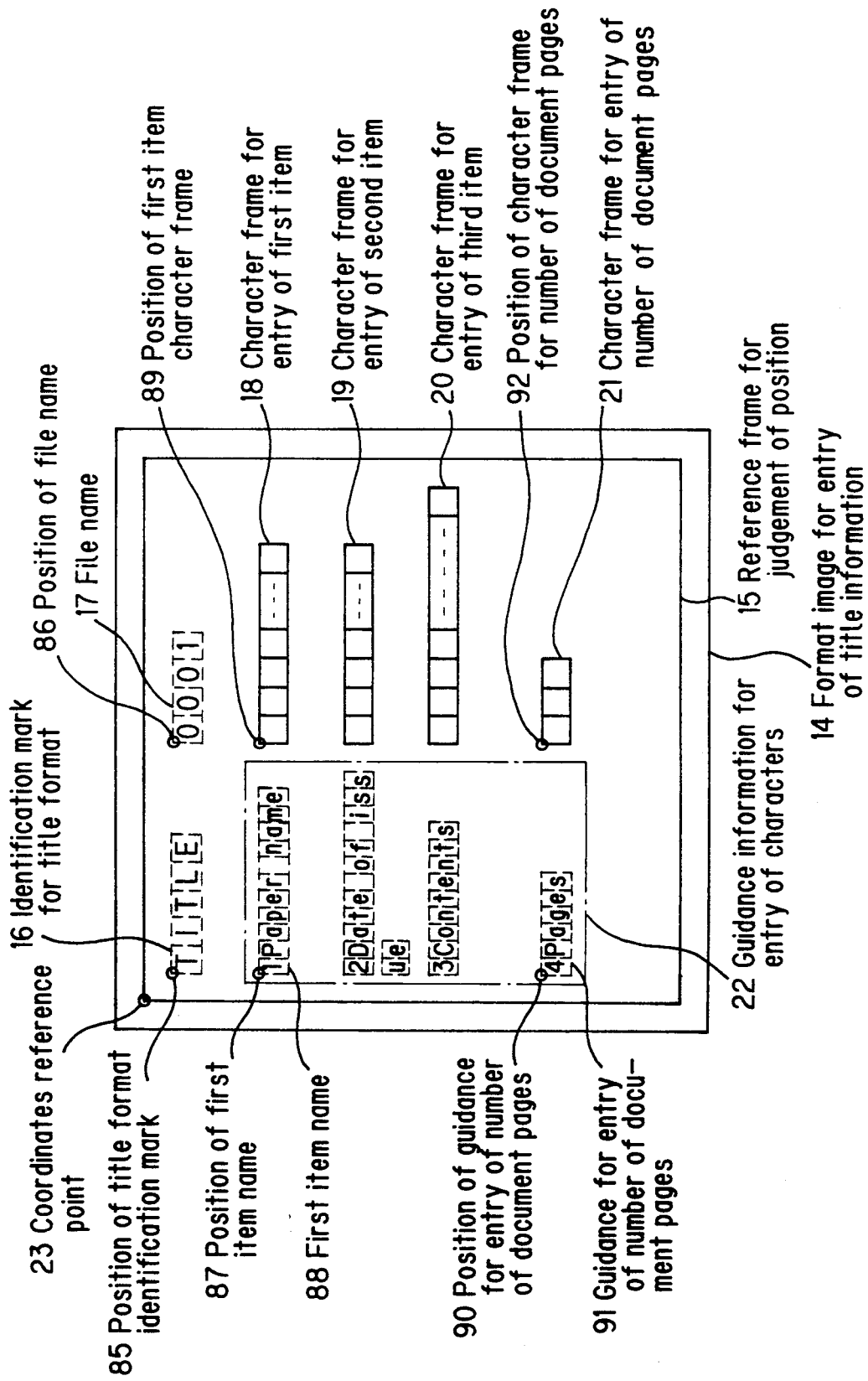
FIG. 2 shows one example of the title information entry format image.

FIG. 2 shows one example of the title information entry format image that is generated based on the form of the above-mentioned title information, which is used for entry of the above-mentioned newspaper clipping information into the file "0001". The image output unit 6 prints out the title information entry format image 14 shown in FIG. 2, which is the title information entry format. The title information entry format image 14 is generated by the pattern generator 8 under the control of the main controller 3. The file name and title information form supplied from the keyboard 4 are temporarily stored in the main memory 2. The CPU 1 reads the file name and title information form from the main memory 2 and uses it in the pattern generator 8 to generate the title information entry format image 14 in the work image memory 10. The title information entry format image 14 comprises a title format identification mark 16 (for 5 characters), file name 17 (for 4 characters), character entry guidance information 22, first item entry character frame 18 (for 10 characters), second entry character frame 19 (for 10 characters), third item entry character frame 20 (for 20 characters), document pages entry character frame 21 (for 3 characters), and a position judging reference frame 15. After the title information entry format is supplied from the image input unit 5 into the image filing device, the title format identification mark 16 (for 5 characters) is used to discriminate whether the supplied image information is one for the title information entry format or not. In this embodiment, five letters "TITLE" are used as the title format identification mark 16. An image data for five characters in the position of the title format identification mark 16 are extracted from the supplied image information and recognized. When the five characters are correctly recognized as "TITLE", it is decided that the supplied image information is the title information entry format image. In this embodiment, the character pattern "TITLE" is used as the title format identification pattern 16, but needless to say, any other character pattern may be used. An image pattern other than characters such as a bar code image or the like may be used. The file name 17 (for 4 characters) indicates which file is intended by the title information entry format image 14. In this embodiment, a file name "0001" is written here. The file name 17 is information for discriminating to which file the title information entry format corresponds, when the user enters the title information entry format with title information. Namely, when the operator files a document into the image filing device, he first selects a file and then has the image filing device read the title information entry format image. The image filing device recognizes the title format identification mark 16, then extracts and recognizes the image data in the character positions of the file name 17, and judges whether the recognized file name is the same as the file selected by the operator or not. The first item entry character frame 18 is an area for entry of the first item of the title information, and has a space for 10 characters. Similarly, the second item entry character frame 19, third item entry character frame 20 and the document pages entry character frame 21 have spaces for 10, 20 and 3 characters, respectively. Guidance information that indicates the contents to be written into each of the entry character frames is generated as character entry guidance information 22 in the title information entry format image 14. The document pages entry character frame 21 (for 3 characters) is a space in which a total number of document pages (number of images) to be filed as one document is entered. In this embodiment, the maximum number of pages per document is 999 and the frame 21 is for 3 characters. The number of pages filled in the document pages entry character frame 21 is used to manage the number of documents fed sequentially from an automatic document feeder of the image input unit 5 at the time of document entry. Namely, when image data for the above-mentioned number of pages is received after the title information entry format is entered, the image filing device will handle the next supplied image data as the title information entry format for the filing of a next new document. The contents of the title information entry format image 14 have been described in the foregoing. In this format, there is further provided a position judging reference frame 15. The position judging reference frame 15 is used to define coordinates for each character frame when generating a title information entry format image, and to correctly read characters by detecting the inclination of the format when reading the title information entry format. Also, the title information entry format image 14 shown in FIG. 2 has fifty two character frames in total.

Figure 3:
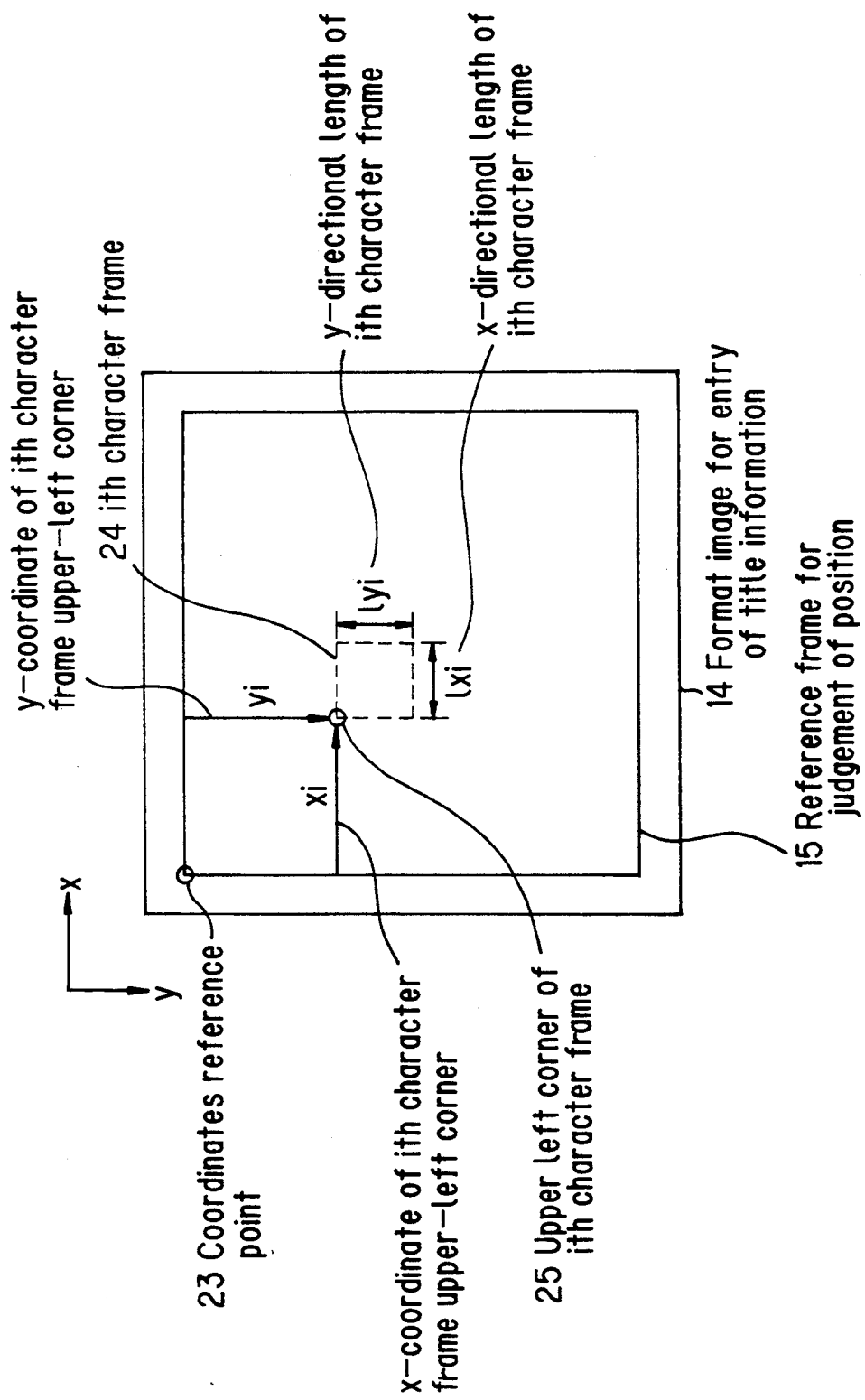
FIG. 3 shows the relation between the position judging reference frame and positions of character frames in the title information entry format image.
Figure 4:
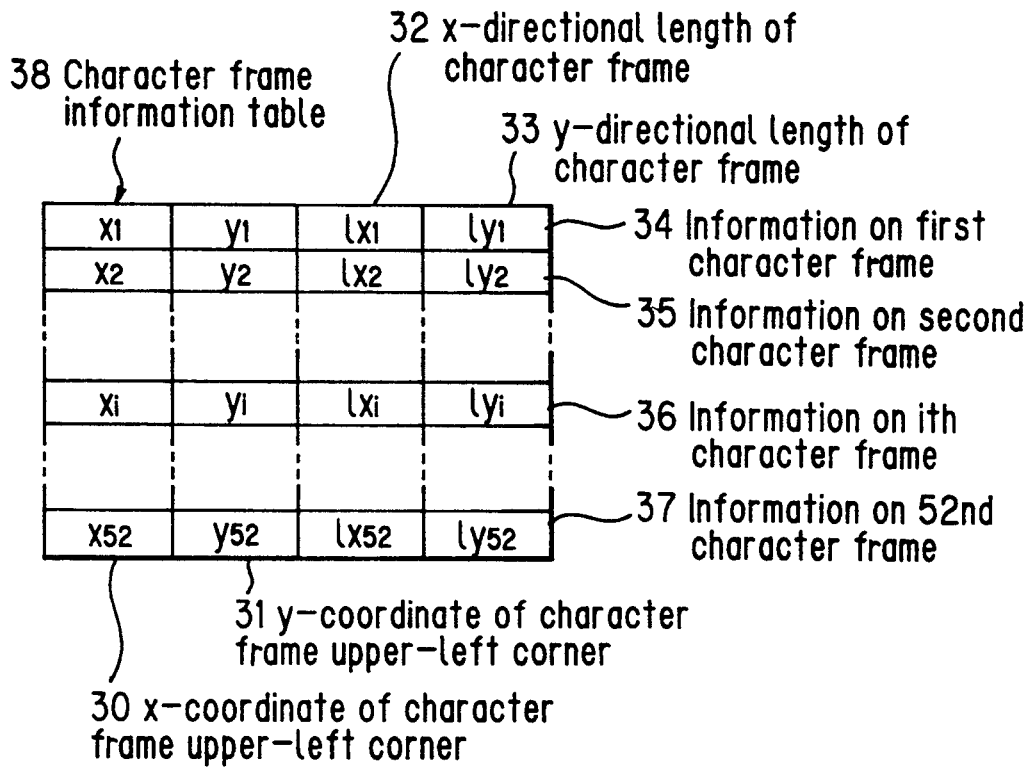
FIG. 4 shows the contents of character frame information table.

FIG. 3 shows the relation between the position judging reference frame 15 and the character frame 24 for the ith character (will be referred to as "ith character frame" hereinafter). The position of the ith character frame 24 in the title information entry format image 14 is defined by the coordinates (x, y) of the upper left point 25 of the ith character frame taking as the origin the coordinate reference point 23 of the upper left point of the position judging reference frame 15. Namely, the position of the ith character frame 24 is expressed by the x-coordinate value xi of the upper left point of the ith character frame 24 and the y-coordinate value yi of the upper left point of the ith character frame, and the size of the ith character frame 24 is expressed by the x-directional length lxi of the ith character frame 24 and the y-directional length lyi of the ith character frame 24. When the title information entry format image 14 is generated in the work image memory 10, the CPU 1 writes into a character frame information table 38 in the main memory 2 as shown in FIG. 4 a position of each character frame taking as the origin the coordinate reference point 23 and a size of each character frame (x-directional length lxi and y-directional length lyi of the character frame). As shown in FIG. 4, the character frame information table 38 consists of an x-coordinate 30 of upper left point, y-coordinate 31 of upper left point, x-directional length 32 and y-directional length 33, of a character frame. The data xi, yi, lxi and lyi of the ith character frame 24 shown in FIG. 3 are written as the ith character frame information 36 into the character frame information table 38 shown in FIG. 4. In case of the title information entry format image 14 shown in FIG. 2, the total number of character frames in the format is for fifty-two characters as previously described. Therefore, the character frame data for five characters composing the title format identification mark 16 is written as the first to fifth character frame information (34, 35) into the character frame information table 38 shown in FIG. 4. Similarly, the character frame data for four characters composing the file name 17 is written as the sixth to ninth character frame information into the character frame information table 38. Also, the character frame data for ten characters composing the first item entry character frame 18 is written as the tenth to nineteenth character frame information into the table 38. Similarly, the character frame data for the second item entry character frame 19 (for 10 character frames), third item entry character frame 20 (for 20 character frames) and document pages entry character frame (for 3 character frames) are written as the twentieth to twenty-ninth character frame information, thirtieth to fourty-ninth character frame information and fiftieth to fifty-second character frame information (37), respectively, into the character frame information table 38.

Next, the procedure for generating the title information entry format image 14 will be explained in detail with reference to the flow chart in FIG. 5.

At the time of clearing the image area (at step 501), the CPU 1 clears the memory area for the title information entry format image 14 within the work image memory 10. Next, at the generation of the position judging reference frame (at step 502), the CPU 1 uses the pattern generator 8 to generate the position judging reference frame 15 by combining the straight lines. The position judging reference frame 15 provides coordinates for the title format entry character frame 16, file name 17, first item entry character frame 18, second item entry character frame 19, third item entry character frame 20 and document pages entry character frame 21, respectively, when generating the title information entry format image 14 as previously described. In this embodiment, the position judging reference frame 15 is a rectangular frame including the images of the above-mentioned elements 16 to 21 and an image of the character entry guidance information 22. The upper left point of the position judging reference frame 15 is the coordinate reference point 23. The position of the coordinate reference point 23 and size of the position judging reference frame 15 can be freely set if they meet the requirement that the frame 15 should be a rectangular frame including the images of the elements 16 to 22. In this embodiment, the position of the coordinate reference point 23 and the size of the position judging reference frame 15 are determined so that when the title information entry format image 14 is printed out, the position judging reference frame 15 is positioned about 10 mm inside the format edges.

Next, at the generation of the title format identification mark (at step 503), the CPU 1 uses the pattern generator 8 to generate image data of the title format identification mark 16. In this embodiment, five letters "TITLE" are formed as the title format identification mark 16. The pattern generator 8 writes the above-mentioned 5-letter character pattern into the work image memory 10 and display image memory 11. At this time, the start addresses written into the work image memory 10 and display image memory 11 correspond to the title format identification mark position 85. Along with this operation of the pattern generator 8, the CPU 1 generates an imaginary character frame including the above-mentioned character pattern. The character frame indicated with a dashed line added to the image of the title format identification mark 16 shown in FIG. 2 shows the above-mentioned imaginary character frame. The CPU 1 writes into the character frame information table 38 in the main memory 2 the coordinates of the upper left point of each imaginary character frame taking as the origin the coordinate reference point 23, the x-directional length and y-directional length of each imaginary character frame. Note that the imaginary character frames are not displayed in the title information entry format image 14 in practice.

Next, at the generation of the file name (at step 504), the CPU 1 reads a file name stored in the main memory 2 and generates a character pattern for the file name 17 using the pattern generator 8. In this embodiment, the file name is "0001". A character pattern of the above four characters is generated and written into the work image memory 10 and display image memory 11. At this time, the start addresses written into the work image memory 10 and display image memory 11 correspond to the file name position 86. As in the generation of the above-mentioned title format identification mark (at step 503), the CPU 1 assumes imaginary character frames including various character patterns and writes coordinate values of each of the imaginary character frames including the x-directional length and y-directional length of each of the character frames into the character frame information table 38. The dashed line added to the image of the file name 17 shows the imaginary character frame and is not displayed as an image.

Next, at steps 505 to 509 in the flow chart, the character entry guidance information image and information entry character frame image are generated for each item. In this embodiment, since the title information consists of three items, the value of k in the processing loop from the steps 506 to 509 varies from 1 to 3, and so the processes at the steps 506 and 507 are repeated three times. In the case k=1, the CPU 1 reads the item name of the first item from the main memory 2 at the generation of the kth item guidance information (at step 506), and uses the pattern generator 8 to generate from a first item name position 87 a character pattern of ten characters in total of the item No. "1" and item name "paper name". The first item name 88 is a guidance indicating the contents of an information to be filled into the first item entry character frame 18 (for 10 characters) and is outside the character recognition area. When the title information entry format is supplied into the image filing device, the position and size of the imaginary character frame of the image of the first item name 88 is not written into the character frame information table 38.

Next, in the generation of the kth item entry character frame (at step 507), the CPU 1 reads the item length (number of characters) of the first item from the title information entry form data in the main memory 2 and uses the pattern generator 8 to generate a character frame of the item length. And it writes the character frame image into the work image memory 10 and display image memory 11. At this time, the start addresses correspond to the first item character frame position 89.

In this embodiment, the item length of the first item is of ten characters, and a character frame image for ten characters is generated as an image of the first item entry character frame 18. At the same time, the CPU 1 writes into the character frame information table 38 the coordinate value of the upper left point of each entry character frame and the character frame size (x-directional length and y-directional length). The character frame indicated with a solid line in the first item entry character frame image 18 indicates the position where the title information in the first item is to be written, and it is actually written as a character frame image into the title information entry format image 14. The generation of the kth item guidance information (at step 79) and generation of the kth item entry character frame (at step 80) when k=2 and k=3 are the same as those when k=1.

Next, in the generation of pages entry guidance information (at step 510), the CPU 10 uses the pattern generator 8 to generate an image of pages entry guidance 91. In this embodiment, the six-character information "4 pages" is used as the pages entry guidance 91, and the above-mentioned six-letter character pattern is written into the work image memory 10 and display image memory 11. The start addresses written at this time correspond to the pages entry guidance position 90. Since the pages entry guidance 91 is outside the character recognition area similarly to the first item name 88, the coordinate of the upper left point of the imaginary character frame and size of the character frame (x-directional length and y-directional length) are not written into the character frame information table 38.

Next, at the generation of pages entry character frame (at step 511), the CPU 1 uses the pattern generator 8 to generate a character frame image for a number of digits specified as the number of document pages. The character frame information thus generated is written into the work image memory 10 and display image memory 11 taking as write start address an address corresponding to a pages entry character frame position 92 in the memories 10 and 11. In this embodiment, the number of digits for the number of document pages is 3, and so a character frame image for three characters is generated for the document pages entry character frame 21. At the same time, the CPU 1 writes into the character frame information table 38 the coordinate value of the upper left point of each entry character frame and the size (x-directional length and y-directional length) of the character frame. The character frame indicated with a solid line in the image of the document pages entry character frame 21 indicates the position in which the number of document pages is to be written and actually displayed as the character frame image in the title information entry format image 14.

In the foregoing, the procedure for generating the title information entry format image 14 has been described. In the above description, the correlation between the title format identification mark position 85, file name position 86, first item name position 87, first item character frame 89, pages entry guidance position 90 and pages character frame position 92 and the size of each character frame have not been described in detail. For ease of using the title information entry format image 14, however, it can be freely laid out and the sizes of character and character frame are selectable. In this embodiment, the layout of the title information entry format image 14 shown in FIG. 2 is used by way of example.

In the above-mentioned embodiment, the generation of each character frame by the CPU 1 which uses the pattern generator 8 has been described. However, the present invention is not limited to this embodiment, but a plurality of character frames may be stored beforehand and used as necessary.

In the aforementioned embodiment, the title information entry format is only a single sheet, but it may be composed of plural sheets. In this case, the title information entry format sheets should preferably be paginated.

As having been described in the foregoing, for generation of a file, (a) the title information entry format image and (b) the character frame information table are generated based on (c) a file name and (d) the form of the title information; and this information (a) to (d) is stored in the image storage 7 as instructed from the CPU 1.

Next, the procedure for filing a document or documents into the image filing device will be described. In the description made below, the file into which the document is to be entered is assumed to be the file "0001" into which the newspaper clipping information is to be entered as in the aforementioned procedure for file generation. The operator operates the keyboard 4 to set the image filing device in the status of title information entry format output and designates a file name ("0001" in this embodiment) into which a document is to be entered and a necessary number of the formats. The CPU 1 reads a title information entry format image 14 corresponding to the designated file from the image storage 7, and stores it into the work image memory 10. Next, the CPU 1 gives an instruction to the image output unit 6 to have the latter print out a designated number of the above-mentioned title information entry format image 14 in the work image memory 10. Here the operation for output of the title information entry format is complete, and the operator may leave the image filing device. Hereafter, another operator can use the image filing device. Next, the operator goes back to his desk carrying back the printed out title information entry format sheet, and writes a necessary title information and number of document pages into the first item entry character frame 18, second item entry character frame 19, third item entry character frame 20 and document pages entry character frame 21, respectively. For entry of plural documents, it is necessary to write the requirements into a title information entry format for each document and attach the title information entry format to the top of each document. Next, the operator returns to the image filing device and operates the keyboard 4 to set the device in the status of document filing and designate a file into which document entry is to be made. The designated file should correspond to the title information entry format. Note that for entry of plural documents, plural files should be designated. When a file is designated, the CPU 1 reads from the image storage 7 a character frame information table 38 corresponding to the designated file and stores it into the main memory 2. Next, the operator sets in the image input unit 5 the document on the top page of which the title information entry format is attached. Since the image input unit 5 is provided with an automatic document feeder, the title information entry format and the plural pages of document may be set in the image input unit 5 at a time. When it is intended to file plural documents, it is possible to simultaneously set plural sets of the title information entry format and document to be filed. Next, when the operator gives an instruction for filing from the keyboard 4, the image input unit 5 reads the image information on the top page and stores it into the work image memory 10. The image data to be stored into the work image memory 10 is the title information entry format for the document to be filed. Here, referring to the contents of the character frame information table 38 stored in the main memory 2, the CPU 1 uses the character extraction/recognition unit 9 to read the title information and number of document pages from the above input image. The read title information and number of document pages are stored temporarily into the main memory 2. Referring to the number of document pages, the CPU 1 gives the image input unit 5 an instruction for continuous input of images for the number of document pages. The document image data supplied from the image input unit 5 are transferred one after another to the image storage 7 through the data bus 93 and stored into a selected file. When the storage of image data for the number of document pages is completed, the CPU 1 writes into the image storage 7 the title information in the main memory 2. Here, the filing of one document is over. In case plural sets of documents are set, the CPU 1 continues to give the image input unit 5 an instruction for reading of the next page. The image input unit 5 reads a next format set in the automatic document feeder and stores it into the work image memory 10. The image data stored in the work image memory 10 is the title information entry format for a next document, and the second document is filed in the same procedure as in the aforementioned filing of the first document. Hereafter, the same process is repeated automatically until the sets of documents set in the image input unit 5 are all filed. In the foregoing, the procedure for document filing in the image filing device has been described.

Next, the procedure for reading the title information and number of document pages from the title information entry format stored in the work image memory 10 will be described in detail with reference to the flow chart in FIG. 6.

Figure 7:
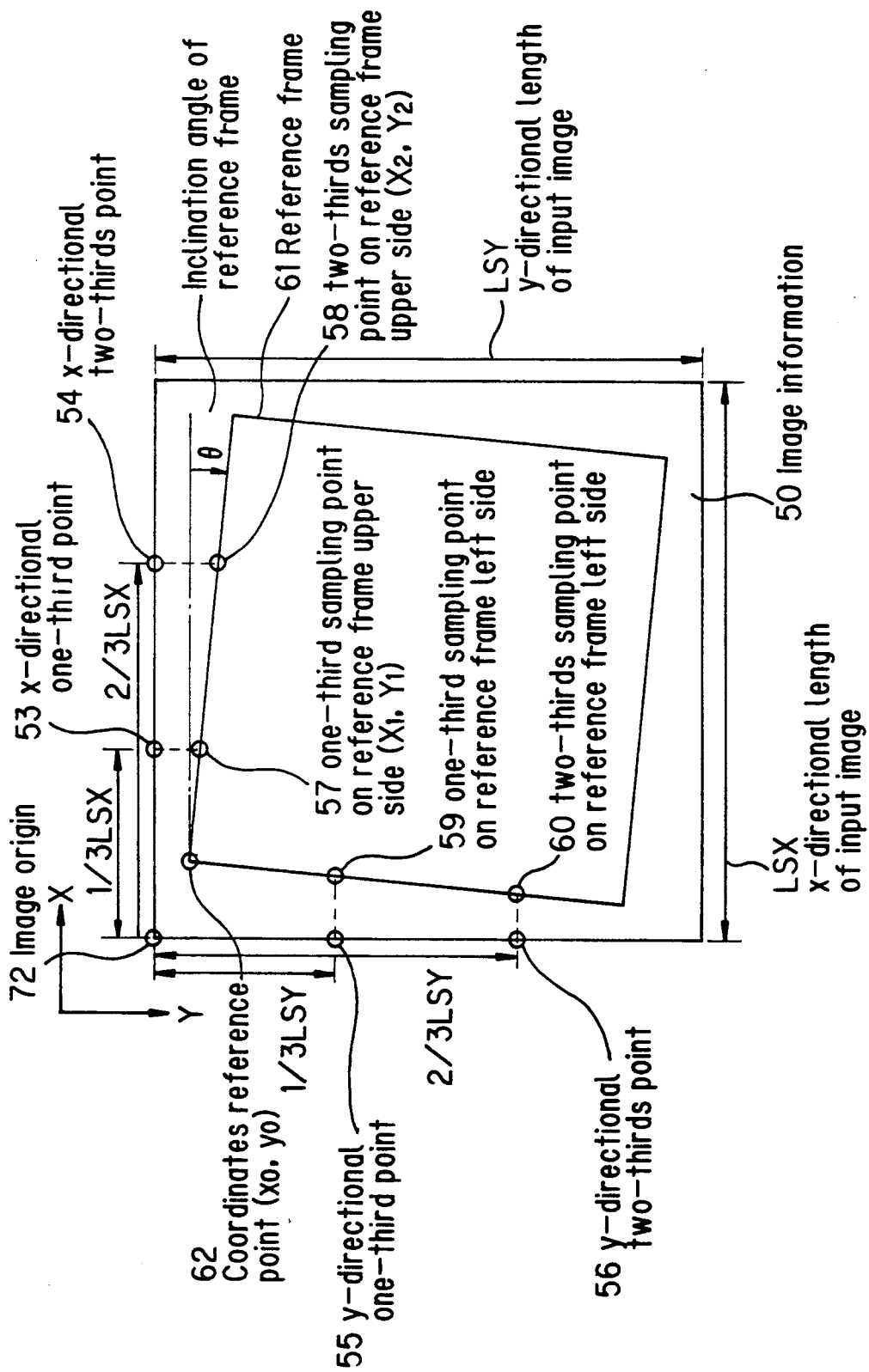
FIG. 7 shows an example image of title information entry format taken in from the image input unit.

The title information entry format set in the image input unit 5 is carried by the automatic document feeder and the photoelectric transducer scans the format being carried and transforms it into two-dimensional image information. Since the title information entry format is mechanically carried, it is difficult to eliminate the offset and skew (or inclination) of an image when image information is taken in. FIG. 7 shows an example of image information stored in the work image memory 10. The title information entry format image 14 among the input image information 50 incurs an offset and skew. In FIG. 7, the reference frame 61 corresponds to the position judging reference frame 15 shown in FIG. 3, and the coordinate reference point 62 corresponds to the coordinate reference point 23 shown in FIG. 3. The reference frame 61 is inclined through an angle $\theta$ with respect to the X axis in the image information 50.

Figure 6:
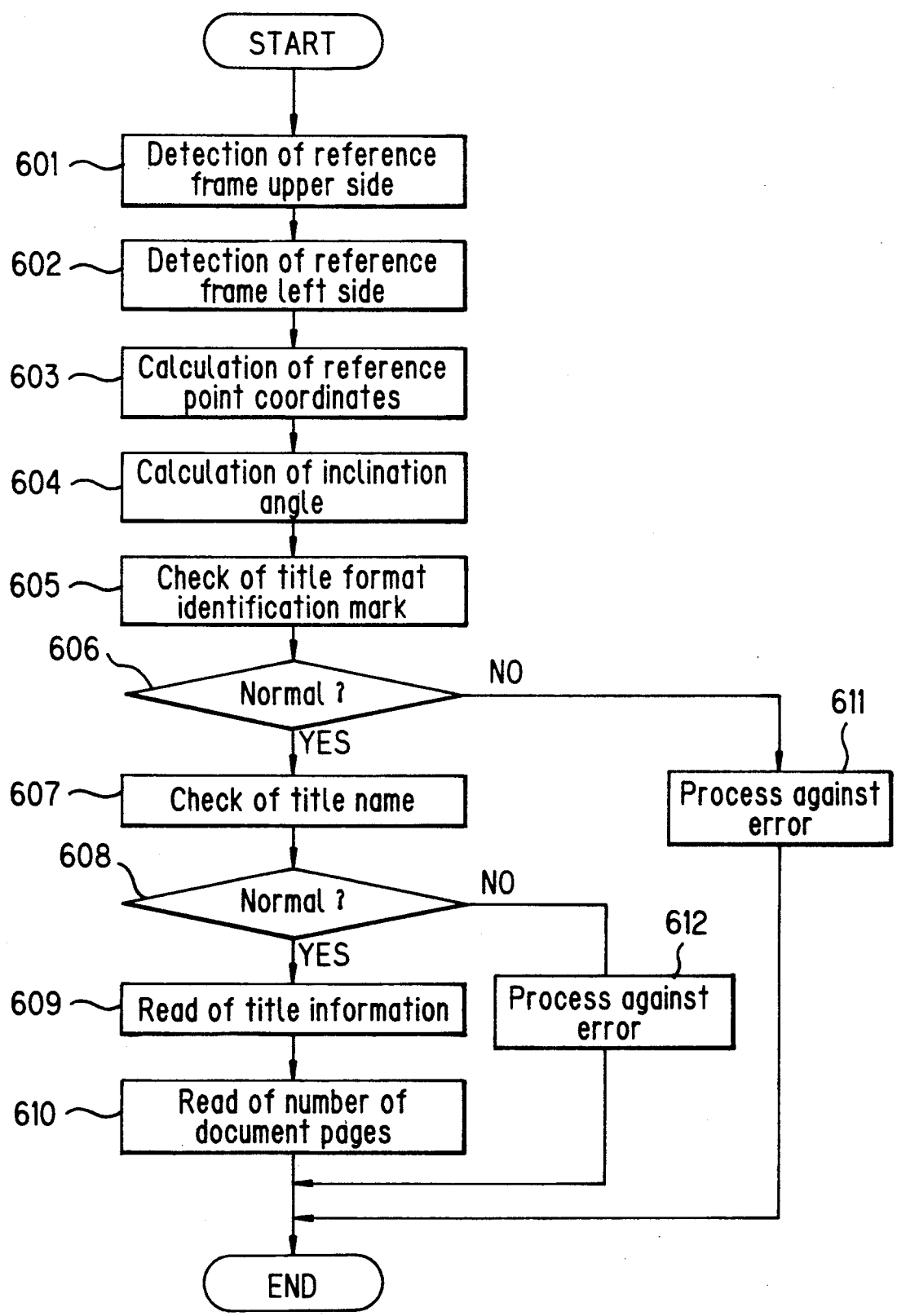
FIG. 6 is a flow chart showing an example procedure for reading the title information entry format.

In the flow chart in FIG. 6, the steps of the detection of the upper side of the reference frame (at step 601) to the calculation of the inclination angle (at step 604) are done to calculate the image information of the reference frame 61 coordinates (X0, Y0) of the coordinate reference point 62 and the inclination angle $\theta$ of the reference frame. The origin of the coordinates (X0, Y0) is the image origin 72 positioned at the upper left point of the image information 50. The steps of the detection of the upper side of the reference frame (at step 601) to the calculation of the inclination angle (at step 604) are done by the CPU 1. First, the detection of the upper side of the reference frame shown at the step 39 will be described below.

At the step 601, the upper side of the reference frame means the upper side of the reference frame 61 and it is defined by calculating the coefficients $A_1$ and $B_1$ of the following equation which expresses a straight line:

$$Y = A_1 X + B_1$$

The above equation is presented by the X-Y coordinate system taking as its origin the coordinates of the image origin 72. The X-directional length of the image information 50 is LSX as shown in FIG. 7, and the one-third point (LSX/3, 0) and the two-thirds point (2LSX/3, 0) of the length LSX are indicated with the reference numerals 53 and 54, respectively. The CPU 1 sequentially reads the image data for each picture element in the image information 50 Y-axially from the X-directional one-third point 53, and judges the picture element data to be "white" or "black" in order to search for points where the picture element data changes from "white" to "black". By this searching for the white-black changing point, the coordinates (X1, Y1) of the one-third sampling point 57 of the upper side of the reference frame 61 shown in FIG. 7 are detected. The coordinates (X1, Y1) thus detected are temporarily stored in the main memory 2. Next, the CPU 1 works in the same manner to search for a point of change from white to black Y-axially from the X-directional two-thirds point 54, thereby detecting the coordinates (X2, Y2) of the two-thirds sampling point 58 of the upper side of the reference frame 61 shown in FIG. 7. The coordinates (X2, Y2) thus detected are temporarily stored in the main memory 2. The upper side of the reference frame 61 is a straight line connecting the two points, that is, the one-third sampling point 57 (X1, Y1) of the upper side of the above-mentioned reference frame 61 and the two-thirds sampling point 58 (X2, Y2) of the upper side of the reference frame 61, and the coefficients $A_1$ and $B_1$ of the equation $Y = A_1 X + B_1$ expressing this straight line can be easily obtained by the following algebraic calculation:

$$A_1 = (Y1 - Y2)/(X1 - X2)$$

$$B_1 = (X1 Y2 - X2 Y1)/(X1 - X2)$$

The CPU 1 reads each of the (X1, Y1) and (X2, Y2) values temporarily stored in the main memory 2, calculates their values according to the above-mentioned equation, and stores the calculation results of $A_1$ and $B_1$ into the main memory 2. In the foregoing, the detection of the upper side of the reference frame at the step 601 has been described.

Next, the detection of the left side of the reference frame at the step 602 will be described below. The detection of the left side of the reference frame 61 at the step 602 is the same as the detection of the upper side of the reference frame 61, and the left side of the reference frame is detected by calculating the coefficients $A_2$ and $B_2$ of the following equation expressing the left side of the reference frame 61:

$$Y = A_2 X + B_2$$

The Y-directional length of the image information 50 is expressed by LSY as shown in FIG. 7, and the one-third point (0, LSY/3) and the two-thirds point (0, 2LSY/3) of the Y-directional length LSY are indicated by the reference numerals 55 and 56, respectively. A point of change from white to black is searched X-axially from the one-third point 55 and two-thirds point 56. By this searching for the changing point, the coordinates of the one-third point 59 and the two-thirds point 60 of the left side of the reference frame 61 shown in FIG. 7 are obtained. The manner of calculating the coefficients $A_2$ and $B_2$ from the two coordinates thus obtained is quite the same as the manner of calculation for detection of the upper side of the reference frame 61 at the step 601. The CPU 1 effects the above process and stores the calculation results $A_2$ and $B_2$ into the main memory 2.

In the above-mentioned detection of the upper and left sides, the coefficients A and B are calculated from the two sampling points, but the present invention is not limited to this manner of detection. For the detecting of the straight lines, the functional coefficients A and B may be calculated from the coordinates of the n sampling points by the method of least squares under the assumption that the number of sampling points is n ($n \geq 3$).

Next, the calculation of the coordinates of the reference point shown at the step 603 will be described. This calculation is intended for obtaining the intersection of the two functions expressing the upper and left sides obtained through the detection of the upper side (at step 601) and left side (at step 602) of the reference frame, and the intersecting point thus calculated is a coordinate reference point 62 (X0, Y0). The values X0 and Y0 can be obtained through a simple algebraic calculation as follows:

$$X0 = (B_2 - B_1)/(A_1 - A_2)$$

$$Y0 = (A_1 B_2 - A_2 B_1)/(A_1 - A_2)$$

The CPU 1 reads the values $A_1$, $B_1$ and $A_2$, $B_2$ stored in the main memory 2, calculates these values according to the above-mentioned equations and stores the calculation results X0 and Y0 into the main memory 2.

Next, the calculation of the inclination angle at the step 604 will be described. The inclination angle $\theta$ of the reference frame can be easily obtained by a simple geometric calculation from the equation $Y = A_1 X + B_1$ expressing the upper side of the reference frame 61 obtained by the detection of the upper side of the reference frame 61 at the step 601, and it is expressed as follows:

$$\tan \theta = A_1$$

The CPU 1 reads the value $A_1$ stored in the main memory 2, calculates it according to the above-mentioned equation, and stores the calculation result $\theta$ into the main memory 2. By the above operations, the coordinates (X0, Y0) of the coordinate reference point 62 and the inclination angle $\theta$ of the reference frame 61 have been obtained, and at this stage, character image can be extracted from the image information 50.

The procedure for extracting and recognizing one character from the image information 50 will be described with reference to the flow chart shown in FIG. 8. The calculation of the position of the ith character frame at the step 801 is intended for obtaining the actual position of the ith character frame in the image information 50 based on the aforementioned coordinates (X0, Y0), inclination angle and the ith character frame information 36 (xi, yi) in the character frame information table 38 shown in FIG. 4. FIG. 9 shows the positional relation between the reference frame 61 and ith character frame 68 in the image information 50. The actual position of the ith character frame 68 in the image information 50 is the coordinates (Xi, Yi) of the upper left point 67 of the ith character frame and there coordinates (Xi, Yi) are the target value of the process at the step 801. The coordinates (xi, yi) in the ith character frame information 36 are those of the xy coordinate system which takes the coordinate reference point 62 (X0, Y0) as origin and the upper side of the reference frame 61 as the x-axis and the left side as the y-axis. The xy coordinate system is rotated through an angle $\theta$ from the XY coordinate system of the image information 50. The relation between the values (Xi, Yi) and (xi, yi) is as follows:

$$Xi = X0 + xi \cos \theta - yi \sin \theta$$

$$Yi = Y0 + xi \sin \theta + yi \cos \theta$$

Namely, the CPU 1 reads the values (X0, Y0), $\theta$ and (xi yi) from the main memory 2, calculates them according to the abovementioned equations and stores the calculation result (Xi, Yi) into the main memory 2.

Figure 9:
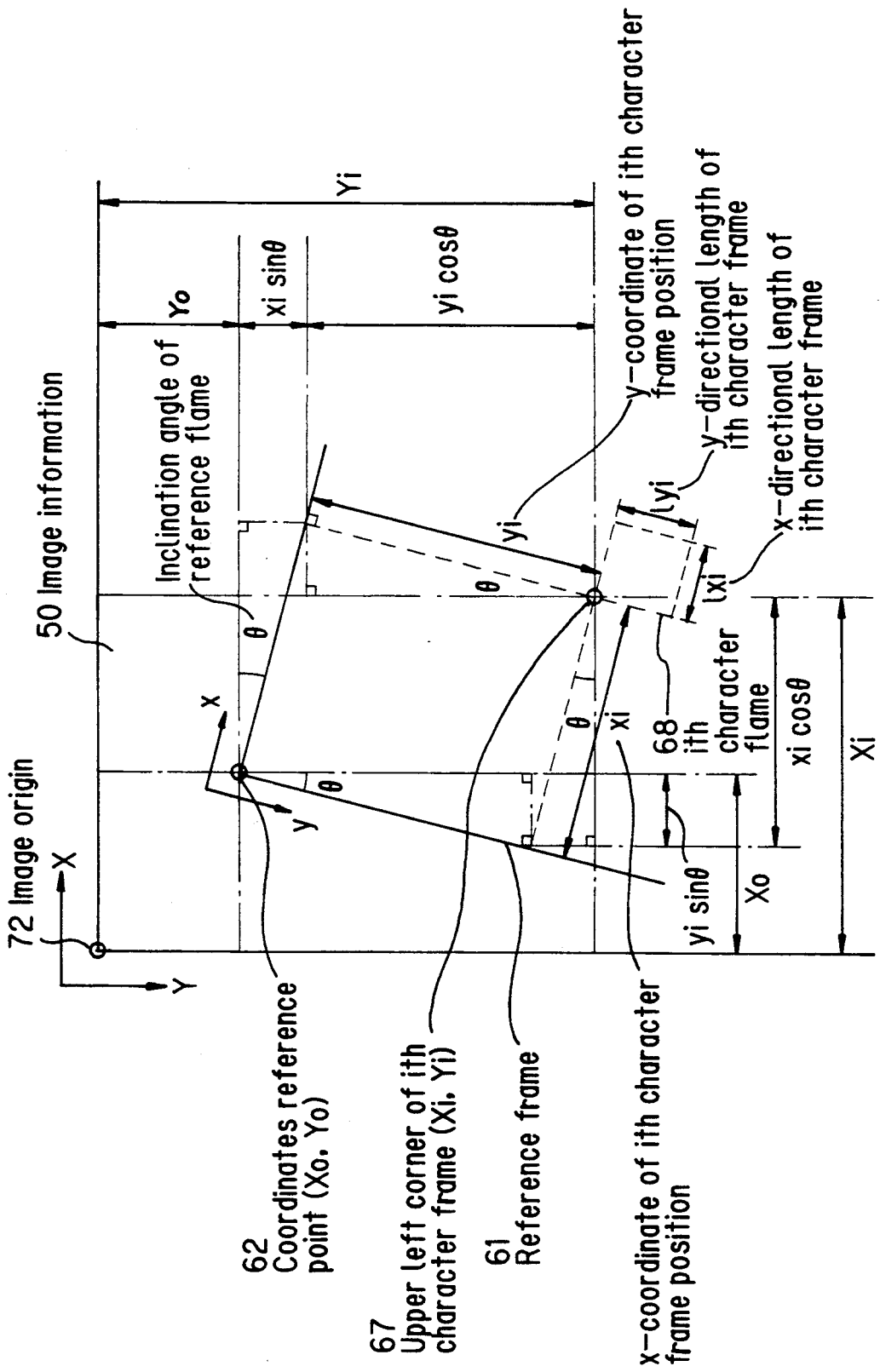
FIG. 9 shows the relation between the position judging reference frame and positions of character frames in the input image.
Figure 10:
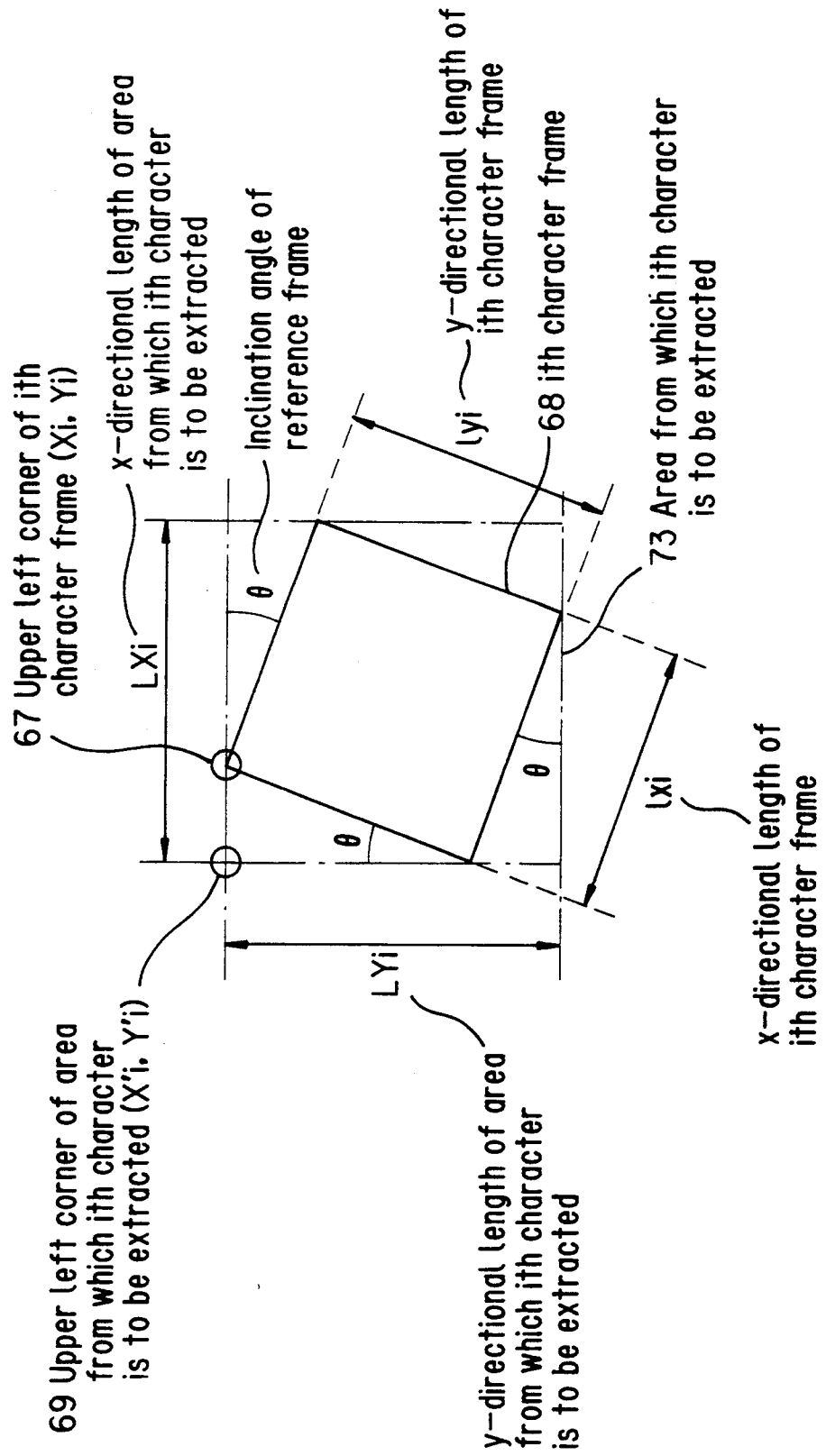
FIG. 10 shows an example area from which a character is extracted.

Next, the calculation of an area from which the ith character is extracted, shown at the step 802, will be explained. The size of the ith character frame 68 shown in FIG. 9 is lxi in the x-direction and lyi in the y-direction. The ith character frame 68 is inclined through an angle $\theta$ with respect to the XY coordinate system. In case an image information for one character is extracted from the image information 50, it is difficult to extract any image with the character frame inclined. So, the position and size of a minimum rectangle including this inclined character frame are obtained and character extraction is made within the minimum rectangle. FIG. 10 shows the relation between the ith character frame 68 and the ith character extraction area 73 including the character frame 68. As seen from FIG. 10, the coordinates (Xi', Yi') of the upper left point 69 of the ith character extraction area, and the X-directional length LXi and Y-directional length LYi of the ith character extraction area are obtained as follows:

$$Xi' = Xi - lyi \cos \theta$$

$$Yi' = Yi$$

$$LXi = lxi \cos \theta + lyi \sin \theta$$

$$LYi = lxi \sin \theta + lyi \cos \theta$$

Namely, the CPU 1 reads from the main memory 2 the values (Xi, Yi), $\theta$ and values lxi and lyi of the ith character frame, calculates them according to the above-mentioned equations and stores the calculation results (Xi', Yi'), LXi and LYi into the main memory 2.

Next, the recognition of the ith character shown at the step 803 will be described. The CPU 1 reads from the main memory 2 the above-mentioned values (Xi', Yi'), LXi and LYi, and supplies them as the information on the ith character extraction area to the character extraction/recognition unit 9 shown in FIG. 1. The character extraction/recognition unit 9 extracts an image information for one character from the image information 50 according to a given information on the ith character extraction area and recognizes the rectangular image thus extracted. Character recognition is a well-known technique already adopted in OCRs (optical character readers), and so it will not be further described here. As having been described in the above, based on the coordinates (X0, Y0) of the coordinate reference point 62, inclination angle $\theta$ of the reference frame 61 and the contents of the character frame information table 38 stored in the main memory 2, a rectangular area including each character frame position can be extracted from the image information 50 and recognized.

Now, the checking of the title format identification mark at the step 605 will be described with reference to FIG. 6 again.

Figure 8:
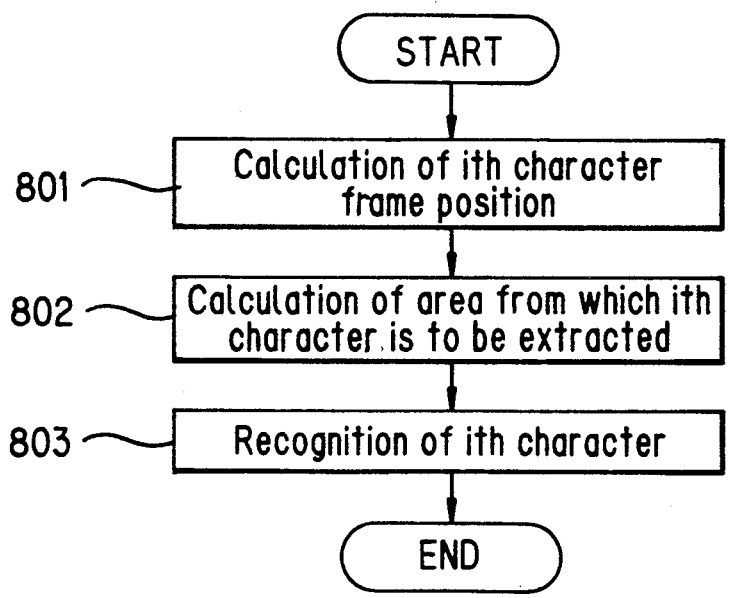
FIG. 8 is a flow chart showing an example procedure for extracting and recognizing one character.

The CPU 1 uses the character frame information for five characters from the first character frame information 34 to the fifth character frame information in the character frame information table 38 shown in FIG. 4 to recognize the character existing in the position of the title format identification mark 16 according to the flow chart shown in FIG. 8. When five characters "TITLE" are obtained as the recognition result, the process is decided to be normal. If the five characters "TITLE" are not obtained as the recognition result, the title format identification mark is decided to be abnormal at step 606. In case the title format identification mark 16 is decided to be abnormal, the CPU 1 transfers the image information 50 in the work image memory 10 to the display image memory 11, displays the contents of the image information 50 on the CRT 13, and alarms the operator of the abnormality by means of a buzzer or the like provided on the keyboard 4.

If the title format identification mark 16 is decided to be normal at the step 606, the file name checking is done at the step 607 as follows. Namely, the CPU 1 uses the character frame information for four characters from the sixth to ninth character frame information in the character frame information table 38 to recognize a character.

Next, the file name recognized at the step 608 is compared with a file name previously keyed in by the operator to judge whether the recognized file name is normal or not. In case plural documents are to be filed, when the recognized file name coincides with one of the plural file names keyed in by the operator, it is decided that the file name is normal. In this embodiment, when the four characters "0001" are obtained as the recognition result, the file name is decided to be normal. If the recognition result is different from "0001", the file name is decided to be abnormal. In the latter case, some corrective action is taken at the step 611.

In case the file name is decided at the step 608 to be normal, the title information is read at the step 609. At this step 609, the CPU 1 uses the character frame information for forty characters from the tenth to forty-ninth character information in the character frame information table 38 to recognize a character. The recognition result is stored as a read title information into the main memory 2. The reading of a number of pages at the step 610 is the same as the reading of the number of pages at the step 609, and the CPU 1 recognizes a character recognition using the character frame information for three characters from the fiftieth to fifty-second character frames. The recognition result is stored as a read number of document pages into the main memory 2.

In case the title format identification mark added to the title information entry format is character-recognized, the format may be decided to be a title information entry format and the subsequent document images may be decided to be those to be stored.

Finally, the operator operates the keyboard 4 to set the image filing device in the document retrieval state and supply a file name and title information of a document to be retrieved. Thereby, the CPU 1 selects from the image storage 7 a file designated by the operator and sequentially reads the title information entered in the file, thereby retrieving an intended document. When the supplied title information coincides with the entered title information read from the image storage 7, the CPU 1 reads a document image corresponding to the above-mentioned title information from the image storage 7 and stores it into the display image memory 11. The document image stored in the display image memory 11 is displayed on the CRT 13. In case a hard copy of the retrieved document image is necessary, the image data in the display image memory 11 is transferred, by supplying a print-out instruction from the key-board 4, to the image output unit 6 which in turn will print out the document image. The above-mentioned procedure for document retrieval is similar to that done in the conventional image filing device.

The embodiment shown in FIG. 1 has been described in the foregoing. In this embodiment, the position judging reference frame 15 is a rectangular frame including various guidance information and character frames in the title information entry format image 14 as shown in FIG. 2, but the reference frame is intended for providing a reference for the positions of the entry character frames and its shape is not limited to a rectangle. For a means to provide a reference for various entry character frames, position judging marks may be provided at the four corners of the title information entry format or read line position designating mark or the like to be provided at the right or left of each read line as already adopted in the general OCRs.

In the above-mentioned embodiment, the positional deviation and inclination (or skew) of the title information entry format are automatically corrected in the image filing device. Therefore, one title information entry format is printed out from the image filing device, and it is copied by a copier for ordinary office use. The copied format can be used as the title information entry format.

The aforementioned position judging reference frame 15 is provided for correction of the problems of input accuracy such as positional deviation, inclination, etc. occurring in the image input unit 5. Therefore, in case the image input unit 5 has a sufficient accuracy for character extraction, the position judging reference frame 15 may be omitted and the entry character frames may be positioned with reference to the edges of the title information entry format.

In the procedure for document filing according to the present invention, the operator first operates the keyboard 4 to designate a file into which a document is to be entered and then sets in the image input unit 5 a to-be-filed document on the top of which the title information entry format is attached, for reading the title information entry format. However, the present invention is not limited to this way of operation, but by locating the title format identification mark 16 and file name 17 in the title information entry format image 14 at positions not depending upon the file and supplying a title name by the operator using the keyboard 4, a file into which a document is to be entered can be automatically selected after the file name 17 is read. In this case, plural sets of title information entry formats and to-be-filed documents can be set in the image input unit 5, and they can be entered into separate files. Therefore, documents over plural files can be entered with a single operation.

In the above-mentioned embodiment, by setting plural sets of title information entry formats and to-be-filed documents in the image input unit 5 and giving an instruction for entry, the following process is done. Namely, the first title information entry format is read, whereby the title information to be added and number of document pages are recognized, the document images are read for the above-mentioned number of document pages, and the read document images are entered. After all the document images are entered, the title information is entered. Thereafter, a next title information entry format set in the image input unit 5 is handled as a title information entry format for a next document and the title information and number of pages of the next document are recognized. However, the present invention is not limited to this embodiment but the following is also possible. Namely, all the images supplied from the image input unit 5 are subject to the recognition with the title format identification mark 16, and when an image in consideration is discriminated as title information entry formats, it is handled as title information entry format. If it is not discriminated as title information entry format, the image is handled as to-be-filed document. In this case, the entry of the number of pages into the document pages entry character frame 21 in the title information entry format is not required.

In this embodiment, item numbers for each item and item name are used as guidance information in the title information entry format. That is, in case of the title information entry format shown in FIG. 2, the contents of an information to be entered into the first item entry character frame 18 (for 10 characters) are designated by the first item name 88 and include an item number and item name (10 characters in total). In this example, when an article of a newspaper A is entered, it is necessary to write "paper A" into the first item entry character frame 18. In case newspaper articles are filed, the kinds of newspapers are limited to a few kinds in many cases and so it is necessary to repeatedly enter the same paper name into the title information entry formats. To solve this problem, the following may be done. Namely, the first item name is arranged for "paper names (1. Paper A, 2. Paper B, 3. Paper C)" and the user enters only one of the numerals) in the first item entry character frame 18. In the above example, the kinds of newspapers for entry are limited to the three kinds, Paper A, Paper B and Paper C. In this case, it suffices to provide the first item entry frame 18 for only one character. When the paper A, for example, is to be entered, the user has only to fill "1" into the first item entry frame 18.

Also, the title information entry format image 14 may be changed in layout as shown below:

"paper name ( ☐ Paper A, " Paper B, ☐ Paper C) The small block ☐ is the entry character frame, and by marking in this frame, a newspaper to be filed is designated.

In this embodiment, the title information entry format image 14 shown in FIG. 2 has arranged thereon a character entry guidance information 22 and entry character frames 18 to 22. However, when the number of characters in the character entry guidance information 22 is too many, all the above guidance information and entry character frames cannot be disposed of in the same image. In such cases, only an item number may be used as the character entry guidance information for each item and a table of correspondence between item number and item name may be provided as a separate image. In FIG. 2, the first item name 88 in the title information entry format has provided in the area thereof only the item number "1", and the table of correspondence between the item number and item name is provided in a separate title information entry format.

Note that the format printed out by the image filing device can be used as the input format for an ordinary OCR. In this case, it is necessary to measure the position of each entry character frame in the printed format and supply the position information of each character frame to the OCR. According to the present invention, however, it is possible to eliminate the need for the key input as follows: Namely, a well-known code information input/output means such as a floppy disk unit or the like is added to the data bus 93 shown in the block diagram in FIG. 1 to record the contents of the character frame information table 38 into the information exchange medium such as the floppy disk or the like. Next, the OCR reads the character frame information table 38 recorded on the information exchange medium, thereby eliminating the need for the key input of the character frame positional information.

What is claimed is:

1. A method for generating an entry format for title information used by an operator for the purpose of storing documents in a predetermined file from among a plurality of files in an image filing device, comprising the following steps of:

entering a form of title information corresponding to the predetermined file, the title information having at least one item, each item including a character frame provided with a character area into which a content of the item is written;

producing a title information entry format image, based on the form of title information entered in the entering step, by generating the character frame for each item;

producing character frame information indicative of a location of each character frame with reference to a position judging reference frame of the title information entry format image;

storing the title information entry format image and character frame information corresponding to the predetermined file; and reading and printing out the stored title information entry format image as the title information entry format.

2. A method according to claim 1, wherein the form of said title information comprises a total number of characters thereof, a number of the items forming the title information, a number of the characters in each of the items and an item name indicative of the contents of each of the items.

3. A method according to claim 2, wherein said title information includes a file name.

4. A method according to claim 3, wherein said file name is character-recognized for recognition of a corresponding file.

5. A method according to claim 2, wherein said title information entry format image includes an identification mark showing the entry format for the title information.

6. A method according to claim 1, wherein said title information includes a file name.

7. A method according to claim 6, wherein said title information entry format image includes an identification mark showing the entry format for the title information.

8. A method according to claim 1, wherein said title information entry format image includes an identification mark showing the entry format for the title information.

9. A method for generating an entry format for title information used by an operator for the purpose of storing documents into a predetermined file from among a plurality of files in an image filing device, comprising:
- a first step of entering a form of title information corresponding to the predetermined file, the information having at least one item, each item including a character frame provided with a character area into which a content of the item is written;
- a second step of producing a title information entry format image, based on the form of title information entered in the first step, by generating the character frame for each item;
- a third step of producing character frame information indicative of a location of each character frame with reference to a position judging reference frame of the title information entry format image;
- a fourth step of storing the title information entry format image and character frame information corresponding to the file;
- a fifth step of carrying out the previous first, second, third and fourth steps repeatedly, thereby storing the respective title information entry format image and the respective character frame information for each of the files; and
- a sixth step of designating one of the files, and reading and printing out one of the stored plural title information entry format images as the corresponding title information entry format for the one file.

10. A method according to claim 9, wherein the form of said title information comprises a total number of characters thereof, a number of items forming the title information, a number of characters in each item and an item name indicative of the contents of each item.

11. A method according to claim 10, wherein said title information includes a file name.

12. A method according to claim 10, wherein said title information entry format image includes an identification mark showing the entry format for the title information.

13. A method according to claim 9, wherein said title information includes a file name.

14. A method according to claim 13, wherein said title information entry format image includes an identification mark showing the entry format for the title information.

15. A method according to claim 13, wherein said file name is character-recognized for recognition of a corresponding file.

16. A method according to claim 9, wherein said title information entry format image includes an identification mark showing the entry format for the title information.

17. A method according to claim 16, wherein in case said mark is character-recognized, any subsequent document is judged to be a document image which is to be stored.

18. A method according to claim 16, wherein when entry of document images corresponding to a number of pages of document image entered in said title information entry format is completed, a next document is judged to be a title entry format.

19. An image processing method for processing documents stored in files comprising the following steps of:
- for each document, storing a title information entry format image and character frame information indicative of a location of a character frame corresponding to at least one item provided in the image, the location of the character frame being determined with reference to a position judging reference frame of the title information entry format image, the character frame being provided with a character area into which the content of an item is written for each file;
- designating one file, and reading and printing out one of the stored plural title information entry format images as the corresponding entry format for title information for a document to be filed in the designated file;
- entering as image information the title information in the entry format for the designated file together with the document to be filed;
- detecting the position judging reference frame from the entered title information entry format image, and extracting the title information from the title information entry format image entered with reference to the result of the detecting step and character frame information stored for each file, and recognizing the characters of the title information; and
- storing the image information of the document to be filed together with the title information into the designated file.

20. A method according to claim 19, wherein the form of said title information comprises a total number of characters thereof, a number of items forming the title information, a number of characters in each item and an item name indicative of the contents of each item.

21. A method according to claim 20, wherein said title information includes a file name.

22. A method according to claim 19, wherein said title information includes a file name.

23. A method according to claim 22, wherein said file name is character-recognized for recognition of a corresponding file.

24. A method according to claim 23, wherein said title information entry format image includes an identification mark showing the entry format for the title information.

25. A method according to claim 19, wherein said title information comprises a number of pages of a document image to be filed.

26. A method according to claim 25, wherein said title information entry format image includes an identification mark showing the entry format for the title information.

27. A method according to claim 19, wherein said title information entry format image includes an identification mark showing the entry format for the title information.

28. An image filing apparatus with a function of generating a title information entry format which is adapted to be used by an operator for the purpose of storing a document into a certain file among a plurality of files, comprising:

means for entering a form of title information corresponding to the file, the information having at least one item, each item including a character frame provided with a character area into which a content of the time is written;

means for producing a title information entry format image, based on the form of title information entered by the entering means, by generating the character frame for each item;

means for producing character frame information indicative of a location of each character frame with reference to a position judging reference frame of the title information entry format image;

means for storing the title information entry format image and character frame information corresponding to the file; and means for reading and printing out the stored title information entry format image as the title information entry format.

29. An image filing apparatus with a function of generating an entry format for title information which is adapted to be used by an operator for the purpose of storing documents into a predetermined file from among a plurality of files in an image filing device, comprising:

first means for entering at least one form of title information, the form corresponding to each file and having at least one item, each item including a character frame provided with a character area into which a content of the item is written;

second means for producing a title information entry format image based on the form of title information entered by the first means, by generating the character frame for each item;

third means for producing character frame information indicative of a location of the character frame with reference to a position judging reference frame of the title information entry format image, for each file;

fourth means for storing the respective title information entry format image and the respective character frame information for each file; and fifth means for reading and printing out one of the stored plural title information entry format images corresponding to the file as the corresponding entry format for title information.

30. An image filing apparatus for filing images in files, comprising:

means for storing a title information entry format image and character frame information indicative of a location of a character frame provided with reference to a position judging reference frame of the image, and having at least one item and a character area corresponding to the character frame, for each of the files;

means for reading and printing out one of the stored plural title information entry format images as the corresponding entry format for title information for a document to be filed;

means for entering, as image information data, the title information in the entry format for title information, together with the document to be filed;

means for detecting the position judging reference frame from the entered title information entry format image, and extracting the title information from the title information entry format image entered with reference to the result of the detecting step and the character frame information stored for each file, and recognizing the characters of the title information; and means for storing the information of the document to be filed together with the title information in a designated one of the files.

* * * * *